United States Patent
Hepp et al.

(10) Patent No.: US 7,763,230 B2
(45) Date of Patent: Jul. 27, 2010

(54) PROCESS AND APPARATUS UTILIZING MIXED LIGAND ORGANOMETALLIC CATALYSTS FOR IN SITU GROWTH OF HIGH PURITY, LOW DEFECT DENSITY CARBON NANOTUBES

(75) Inventors: Aloysius F. Hepp, Bay Village, OH (US); Jerry D. Harris, Nampa, ID (US)

(73) Assignee: Nanotech Innovations, LLC, Oberlin, OH (US)

(*) Notice: Subject to any disclaimer, the term of this patent is extended or adjusted under 35 U.S.C. 154(b) by 598 days.

(21) Appl. No.: 11/595,343

(22) Filed: Nov. 9, 2006

(65) Prior Publication Data

US 2010/0086682 A1 Apr. 8, 2010

Related U.S. Application Data

(60) Provisional application No. 60/735,510, filed on Nov. 10, 2005.

(51) Int. Cl.
*D01F 9/12* (2006.01)
(52) U.S. Cl. .................................. 423/447.3; 977/843
(58) Field of Classification Search .............. 423/447.1, 423/447.2, 447.3; 977/742–752, 842–848
See application file for complete search history.

(56) References Cited

U.S. PATENT DOCUMENTS 6,806,397 B1 * 10/2004 Reilly ........................ 585/446

2003/0086859 A1 * 5/2003 Kawakami et al. ....... 423/447.1
2003/0108477 A1 * 6/2003 Keller et al. ............. 423/447.1

OTHER PUBLICATIONS

Endo, et al., Comparison study of semi-crystalline and highly crystalline multiwalled carbon nanotubes, Applied Physics Letters 2001; 79(10): 1531-1533.*
Kamalakaran, et al., Synthesis of thick and crystalline nanotube arrays by spray pyrolysis, Applied Physics Letters 2000; 77(21): 3385-3387.*
Terrones, et al., Novel nanoscale gas containers: encapsulation of N2 in $CN_x$ ¬ nanotubes, Chem. Commun. 2000; 2335-2336.*

(Continued)

*Primary Examiner*—Stanley S. Silverman
*Assistant Examiner*—Daniel C. McCracken
(74) *Attorney, Agent, or Firm*—Nutter McClennen & Fish LLP; Reza Mollaaghababa; Joshua T. Matt

(57) ABSTRACT

The present invention relates to a simple method for the synthesis of fullerenes using a mixture of liquid metallorganic precursors and liquid organic hydrocarbon solvents wherein the mixture is injected in the form of droplets into a multiple heated zone reactor tube in which the droplets are thermally decomposed and fullerenes are formed. The process is useful for the formation of all types of fullerenes, and in particular yields multi-walled carbon nanotubes (MWNTs) with low defect density and controllable wt % of metal impurity atoms. In particular, a method is disclosed that produces as-grown MWNTs with less than 5 wt % metal impurity atoms. Large classes of metallorganic precursors suitable for use in the process are also identified.

72 Claims, 3 Drawing Sheets

OTHER PUBLICATIONS

Harris, et al., Growth of multi-walled carbon nanotubes by injection CVD using cyclopentadienyliron dicarbonyl dimmer and cyclooctatetraene iron tricarbonyl, Materials Science and Engineering B 2005; 116: 369-374.*

"ScienceDirect" publisher website for: Harris, et al., Growth of multi-walled carbon nanotubes by injection CVD using cyclopentadienyliron dicarbonyl dimmer and cyclooctatetraene iron tricarbonyl, Materials Science and Engineering B 2005; 116: 369-374.*

Endo, et al. Comparison of semi-crystalline and highly crystalline multiwalled carbon nanotubes, Applied Physics Letters 2001; 79(10): 1531-1533.*

Huang, et al., Patterned Growth and Contact Transfer of Well-Aligned Carbon Nanotube Films, J. Phys. Chem. B 1999; 103: 4223-4227.*

F. Albert Cotton et al., Advances Inorganic Chemistry, 6th ed., 1999, John Wiley & Sons, Inc., ISBN 0-471-1995; 7-5, pp. 35-37.

Albright, Thomas A., "Chemistry 6312, Bonding"; University of Houston, Department of Chemistry; http://www.chem.uh.edu/Courses/Albright; © 2006, Chapter 15, "The Isolobal Analogy", pp. 199-205.

Hoffman, Ronald, "Building Bridges Between Inorganic and Organic Chemistry", Nobel lecture, Dec. 8, 1981, pp. 34-66.

Nyamori, Vincent O. et al., "The use of Organometallic Transition Metal Complexes in the Synthesis of Shaped Carbon Nanomaterials", Journal of Organometallic Chemistry 693, 2008 Elsevier B.V., pp. 2205-2222.

* cited by examiner

US 7,763,230 B2

PROCESS AND APPARATUS UTILIZING MIXED LIGAND ORGANOMETALLIC CATALYSTS FOR IN SITU GROWTH OF HIGH PURITY, LOW DEFECT DENSITY CARBON NANOTUBES

CROSS REFERENCE TO RELATED APPLICATIONS

This application claims the benefit of U.S. Provisional Application No. 60/735,510, filed Nov. 10, 2005, which is incorporated herein by reference.

STATEMENT REGARDING FEDERALLY SPONSORED RESEARCH OR DEVELOPMENT

This invention was made with government support. The government has certain rights in the invention.

FIELD OF THE INVENTION

The present invention relates to the production of fullerenes by a simple method that uses the thermal decomposition of any of several mixed ligand organometallic catalysts (or equivalently, mixed ligand metallorganic precursors) to produce said fullerenes. Mixed ligand refers to the fact that the precursor compounds used in the present method contain both carbonyl and ring ligand types. The presence of both ligand types in a single molecule results in a very efficient decomposition of the molecule, yielding both metal and carbon atoms. Under suitable conditions the metal atoms form clusters and serve as catalysts for the growth of fullerenes using the same carbon atoms released by the thermal decomposition of the mixed ligand precursor. Fullerenes produced by the process described herein have low structural defect densities. Of equal or greater significance, they have levels of metal impurities that are lower than the impurity levels of the so-called "purified" cnts sold by essentially all of today's commercial vendors. Several metallorganic precursor compounds suitable for use in the simple process disclosed herein are also identified.

BACKGROUND OF THE INVENTION

Fullerenes are broadly defined as the third form of the element carbon after diamond and graphite. Fullerenes are molecular solids that consist of fused six-membered and five-membered rings of carbon atoms. Two general types of fullerenes may be described: Buckyballs and carbon nanotubes. Buckyballs are typified by the essentially spherical $C_{60}$ molecule. The term Buckyballs also refers to other approximately spherical closed fullerenes such as $C_{70}$ and higher oligomers. Single wall carbon nanotubes (SWNTs) are elongated, cylindrically shaped members of the fullerene family. Multi-walled carbon nanotubes (MWNTs) are comprised of two or more single walled carbon nanotubes nested within one another.

Fullerenes have come under intense multidisciplinary study because of their unique physical and chemical properties. They have many potential applications across a multitude of product areas ranging from electronics to composites to biotech, medicine and many more. Fullerenes are a desirable allotrope of carbon not only because of their similarity to graphite but also because they have a high surface area that can serve as a storage medium for small molecules. (Hydrogen and lithium are prime examples.)

Advances in a wide range of nanotechnology applications depend critically on the availability of suitable starting materials. In the case of applications and products using carbon nanotubes (CNTs), the critical issues are freedom from defects and attaining low levels of impurities. Both problems are related to growth conditions and parameters. Prior to the discovery of the art described in the present invention it has been virtually impossible to control the defect densities and impurity levels of fullerenes.

The fabrication of fullerenes involves high temperatures and metal catalysts. Two conditions are of critical importance to expanding the use of fullerenes in the future: 1) a simple method of producing them and 2) producing them with as-produced levels of impurity contamination and structural perfection that significantly reduce the extent and cost of post-production processing.

Nanotubes and nanofibers have been produced by several techniques including arc discharge, laser ablation, flame synthesis and a variety of chemical vapor deposition (CVD) methods. Two of the most promising methods for depositing commercial quantities of aligned multiwalled carbon nanotubes are the "floating catalyst" CVD method and the injection CVD method. For the injection method, an organic solvent containing a dissolved organometallic compound that decomposes to form the metal catalyst is injected into a two-zone furnace. Both the solvent and the catalyst vaporize in the first zone, and a carrier gas sweeps the vapors into the second zone where the organometallic compound decomposes to yield nanoparticles of the metal catalyst. Solvent and ligand molecules serve as the carbon source for nanotube growth at the catalyst sites. CNT purity is determined by the extent to which other materials, such as the metal catalyst and various forms of carbon (e.g. amorphous carbon) that may be created during the thermal decomposition and in the growth process, adhere to the CNTs after removal from the growth apparatus. Currently known techniques to remove the unwanted impurities are slow, difficult to use, and costly. There is also little known about ways to reduce the defect density of CNTs once they have been grown.

SUMMARY OF THE INVENTION

Accordingly, it is an object of this invention to provide a simple method for growing fullerenes specifically including, but not limited to, high purity, low defect density single and multi-walled carbon nanotubes. The method uses a specially designed reactor tube and a novel mixed ligand metallorganic precursor compound for the efficient deposition of both the metal atoms that serve as the catalyst initiating and sustaining the growth of MWNTs, and the carbon atoms from which they are actually grown. It is another object of this invention to describe a wide range of mixed ligand metallorganic precursor compounds that can be incorporated in the disclosed method and reactor tube to achieve fullerene growth as well.

BRIEF DESCRIPTION OF THE DRAWINGS

Embodiments of the present invention will now be described with reference to the attached Figures, wherein.

DESCRIPTION OF THE PRESENT INVENTION

A mixed ligand metallorganic precursor and a process for using it have been invented that together enable growth of fullerenes with lower defect densities and lower impurity levels than are generally available using prior art. Specifically, prior art produces multi-walled carbon nanotubes with higher concentrations of iron (7-22%) and other carbonaceous impurities compared to those produced using the art proposed in this disclosure. The compounds available that might serve as efficient catalysts for the prior art typically contain iron or other metals, and organic ligands. The organometallic compounds commonly used are metallocenes (Fe, Co, Ni or Ru) and iron pentacarbonyl, [$Fe(CO)_5$].

We have explored a wide range of metallorganic precursor compounds in an effort to realize a more efficient carbon nanotube synthetic route. We present evidence of both single walled and multiwalled carbon nanotube growth using cyclopentadienyliron dicarbonyl dimer and cyclooctatetraene iron tricarbonyl as precursor sources. Novel features are that the precursor(s) are of a different structure from the prior art. The current precursor combines both ligand types (carbonyl and ring). That is, they contain both types of reactive species found in separate compounds in prior art. This approach can be expanded to include other metals and mixed metal systems in addition to iron to produce families of potential precursors for improved synthesis and/or to dope heteroatoms into the tubes —$(OC)_5Mn$—$Fe(CO)(PR_3)(C_5H_5)$. The doping ligand ($PR_3$, R=alkyl or aryl) could alternatively be attached to the Mn atom.

Figure 1:
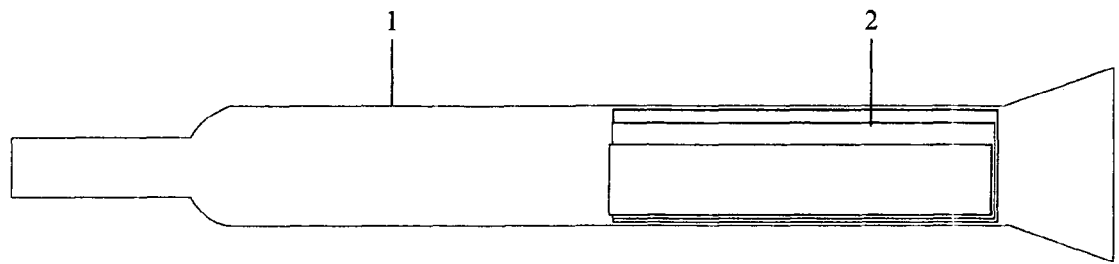
FIG. 1 shows a reactor tube (1) with quartz baffles (2) as additional surfaces, said reactor tube to be inserted into a two-zone furnace.
Figure 2:
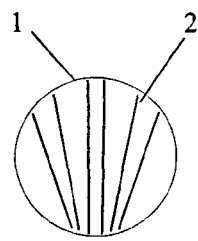
FIG. 2 shows a reactor tube (1) end view and arrangement of said quartz baffles (2).
Figure 3:
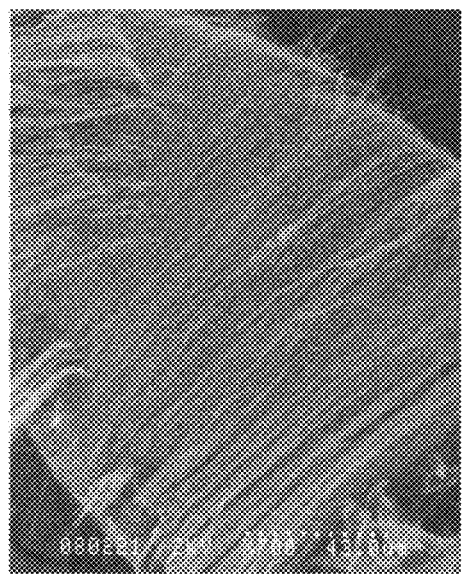
FIG. 3 shows a photomicrograph of as-grown multi-walled carbon nanotubes.
Figure 4:
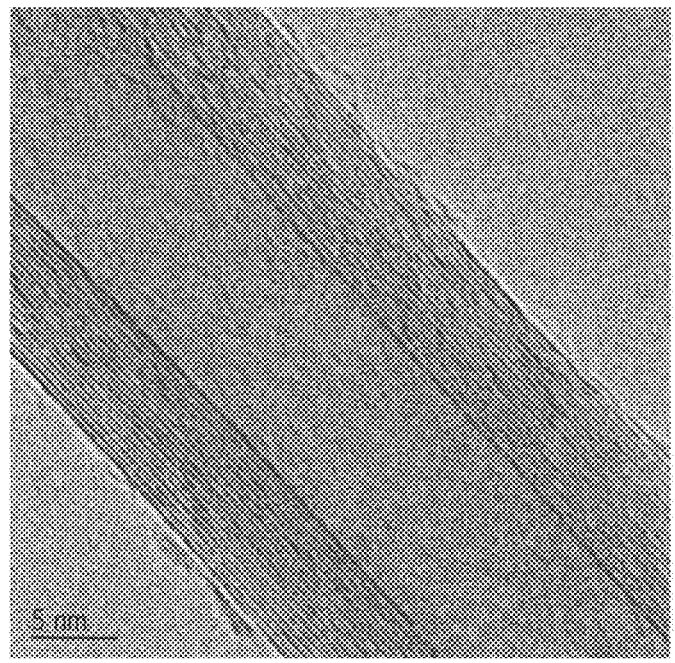
FIG. 4 shows a photomicrograph of the cross section of an individual MWNT grown using the present invention. Typical multi-wall tubes are from ten to twenty walls with a diameter of ~20 nm.
Figure 5:
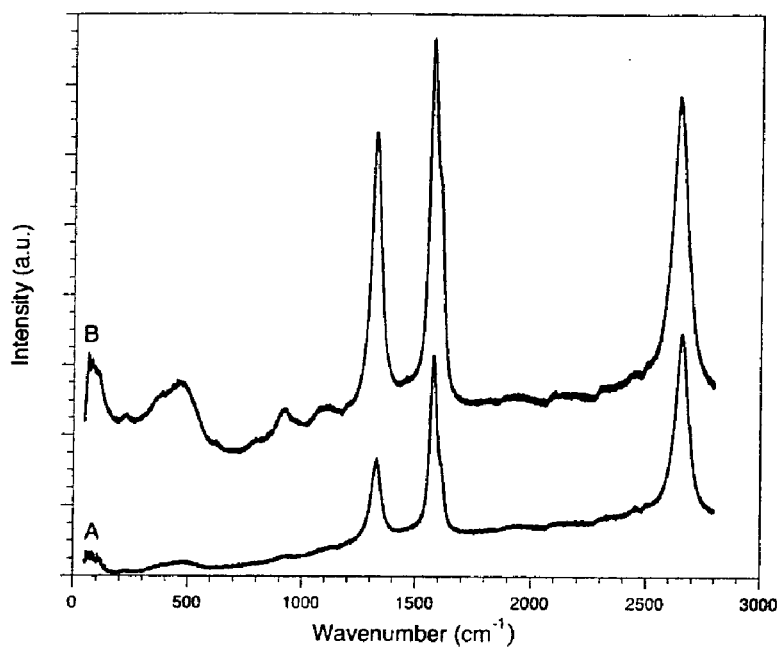
FIG. 5 shows an analytical measurement depicting the relative high quality of the MWNTs grown using the present invention. Shown is raman spectra of carbon nanotubes grown using (A) 0.06 M and (B) 0.03 M concentrations of cyclopentadienyliron dicarbonyl dimer. Raman spectra are used as a guide to the purity of nanotubes, the tubes produced by this process are superior to those sold by vendors after purification.
Figure 6:
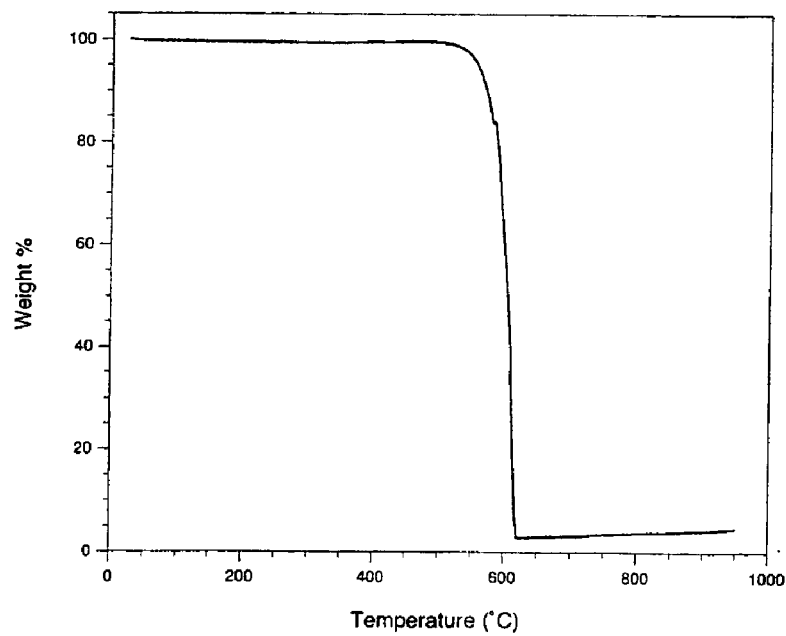
FIG. 6 shows the results of a thermogravimetric analysis (TGA) of the amount of iron impurity found in a collection of MWNTs grown using the present invention. Shown is TGA of carbon nanotubes grown using cyclopentadienyliron dicarbonyl dimer as the iron source. Note the narrow (75° C.) decomposition range as the organics are lost during processing.

CNT growth takes place in a specially designed reactor tube that is placed in a two-zone furnace. The reactor tube's configuration has been optimized to minimize metal impurity (see attached FIG. 1). In the first zone, the solvent and catalyst are vaporized, and in the second zone, carbon nanotubes grow at nucleated metal sites formed by metal atoms freed by the decomposition of the metallorganic precursor. The first zone requires temperatures high enough to vaporize the organic hydrocarbon solvent, but low enough to minimize precursor decomposition. Temperatures ranging from 175°-200° C. have been shown to work for the first zone. A temperature of 700° C. has been shown to work well for the second zone. A crucial aspect of the reactor furnace design is that the two zones of the furnace must be separated enough to minimize thermal leakage and maximize the temperature gradient between furnace zones. To do this requires that the two temperature zones be separated by at least one inch.

The quantity of carbon nanotubes grown during a deposition is dependent on several factors, one of which is the inner surface area of the reactor tube (1).

Increasing the inner surface area of the reactor tube (1) increases metal nucleation sites and thus the quantity of carbon nanotubes grown per deposition. By including additional surface area (such as a set of baffles (2)) in the reactor tube (1) the nanotube yield has been observed to increase by at least 33% over that of depositions without the baffles (2).

The deposition equipment is comprised of a specially designed reactor tube (1), two-zone furnace, and spray system. Sample conditions in our early stage system include: Syringe pump: Volume: 2-5 mL; 2 mL/hr injection rate; Carrier Gas: $H_2/N_2$ or $H_2/Ar$, 1.5 L/min; Substrate: Metal or Quartz; Solution: Catalyst in toluene at various concentrations; Temperature(s): Zone 1—200° C. & Zone 2—650° C.-800° C. The substrate, concentration, flow rate, catalyst, or fluid media may be changed and will impact the quality of tubes produced. Most current theory is that metal particles (from decomposed precursors) on deposited on properly heated surfaces support the growth of nanotubes. Test data consisted of SEM, TEM, Raman, and TGA, see FIGS. 3-6.

BENEFITS OF THE PRESENT INVENTION

The present invention resolves many of the issues hindering production of higher quality CNTs compared to what is possible using the presently known production techniques, and will enable a wide range of applications to be demonstrated at lower cost than previously possible.

In particular, carbon nanotubes show tremendous promise for improving the performance of power devices such as thin film polymeric and/or inorganic solar cells, direct-methanol fuel cells, lithium-ion ($Li^+$) batteries, ultra capacitors, and thermionic power supplies. In many of the power applications, the carbon nanotubes are used in concert with other materials (i.e., Nafion™ for PEM fuel cells, poly(3-octylthiophene) (P3OT) for thin film photovoltaic solar cells, or polyacrylonitrile in $Li_+$ batteries), often as a composite thin film. Garnering control over the properties of both the carbon nanotubes and the resulting composites is an important step towards realizing device optimization. This control can be obtained by understanding the synthesis and chemical processing associated with desired device characteristics. Demonstrations of the fabrication, testing, and analysis of PEM fuel cells, polymeric solar cells, Li+ batteries, and thermionic emitters, illustrate the viability of carbon nanotubes in power applications.

Biotechnical applications that will benefit from the present invention include high sensitivity biochemical and biological sensors, lower cost microarrays for genomic mapping and medical diagnostics, targeted drug delivery systems (including a myriad of related approaches for preparing and dispensing personalized medicines,) in vivo photon sources for both diagnostic and photodynamic therapeutic purposes and a range of biomimetic devices such as artificial retinas, neuron replacement and other possibilities.

Still other examples of the utility of the present invention are the electronic and optoelectronic applications that will benefit from the higher purity, lower defect density, and lower cost carbon nanotubes. Applications made possible by the present invention include, but are not limited to, CMOS imaging devices, wide intensity range photon sensors, and next generation integrated circuits (ICs) including improved interconnects along with nanoscale active and passive IC components.

It should be clear to those skilled in the prior art of making carbon nanotubes that the present invention will have a major impact on many fields of application.

EXAMPLES

The following examples are presented to illustrate the ease and versatility of both the method for growing fullerenes and the use of double ligand metallorganic precursors and they are not to be construed as the only examples of the proposed method. Neither are they to be considered as limiting the scope of the present invention. It is understood that a practitioner of ordinary skill in the art will be able to employ alternative precursor compounds and reactor tubes of ordinary design to achieve fullerene growth. It is also understood that such alternative methods will yield poorer quality fullerenes compared to those produced using the present method.

Example 1

Multiwalled carbon nanotubes were synthesized using $[C_5H_5Fe(CO)_2]_2$ (0.115 g) dissolved in toluene (5 ml). The solution was injected into the first zone of the 2-zone furnace, at a rate of 2 ml/hr. The solution was injected using a syringe, syringe needle and syringe pump. The temperature of the first zone of the furnace was maintained at 200° C. The vaporized $[C_5H_5Fe(CO)_2]_2$ catalyst and solvent were swept into the second zone of the furnace by a 4% $H_2$/96% Ar carrier gas with a flow rate of 1.5 liters/minute. In the second zone of the furnace, the carbon nanotubes grew on the walls of the furnace where the temperature ranged from 685°-750° C. The temperature of the second zone, as measured in the center zone, was maintained at 775° C. Analysis of the nanotubes by thermogravimetric analysis (TGA) revealed that the carbon nanotubes contained only 2.8 wt. % iron.

Example 2

Multiwalled carbon nanotubes were synthesized using $C_8H_8Fe(CO)_3$ (0.145 g) dissolved in toluene (2 ml). The solution was injected into the first zone of the 2-zone furnace, at a rate of 2 ml/hr. The solution was injected using a syringe, syringe needle and syringe pump. The temperature of the first zone of the furnace was maintained at 200° C. The vaporized $C_8H_8Fe(CO)_3$ catalyst and solvent were swept into the second zone of the furnace by a 4% $H_2$/96% Ar carrier gas with a flow rate of 1.5 liters/minute. The temperature of the second zone, as measured in the center zone, was maintained at 700° C. Carbon nanotubes coated inside surface of the reactor tube over the entire length of the second zone. Additionally, carbon nanotubes grew on $SiO_2$ substrates and stainless steel, copper and molybdenum foil substrates. Analysis of the nanotubes by scanning electron microscopy with energy dispersive spectroscopy (SEM-EDS) revealed that the carbon nanotubes contained only 3 wt. % iron.

Example 3

Multiwalled carbon nanotubes were synthesized using $C_8H_8Fe(CO)_3$ (0.195 g) dissolved in toluene (4 ml). The solution was injected into the first zone of the 2-zone furnace, at a rate of 2 ml/hr. The solution was injected using a syringe, syringe needle and syringe pump. The temperature of the first zone of the furnace was maintained at 200° C. The vaporized $C_8H_8Fe(CO)_3$ catalyst and solvent were swept into the second zone of the furnace by a 4% $H_2$/96% Ar carrier gas with a flow rate of 1.5 liters/minute. The temperature of the second zone, as measured in the center zone, was maintained at 700° C. Carbon nanotubes coated inside surface of the reactor tube over the entire length of the second zone. Additionally, carbon nanotubes grew on $SiO_2$ substrates and tantalum foil substrates.

Example 4

Multi-walled carbon nanotubes were synthesized using $[C_5H_5Fe(CO)_2]_2$ (0.354 g) dissolved in pyridine (5 ml). The solution was injected into the first zone of the 2-zone furnace, at a rate of 2 ml/hr. The solution was injected using a syringe, syringe needle and syringe pump. The temperature of the first zone of the furnace was maintained at 200° C. The vaporized $[C_5H_5Fe(CO)_2]_2$ catalyst and solvent were swept into the second zone of the furnace by a 4% $H_2$/96% Ar carrier gas with a flow rate of 1.5 liters/minute. The temperature of the second zone, as measured in the center zone, was maintained at 700° C. Carbon nanotubes coated the inside surface of the reactor tube over the entire length of the second zone.

Example 5

Multiwalled carbon nanotubes were synthesized using $[C_5H_5Fe(CO)_2]_2$ (0.055 g) dissolved in toluene (5 ml). The solution was injected into the first zone of the 2-zone furnace, at a rate of 1.5 ml/hr. The solution was injected using a syringe, syringe needle and syringe pump. The temperature of the first zone of the furnace was maintained at 200° C. The vaporized $[C_5H_5Fe(CO)_2]_2$ catalyst and solvent were swept into the second zone of the furnace by a 4% $H_2$/96% Ar carrier gas with a flow rate of 1.5 liters/minute. In the second zone of the furnace, the carbon nanotubes grew on the walls of the furnace and on aluminum oxide (Al2O3) substrates where the growth temperature ranged from 685°-750° C. The temperature of the second zone, as measured in the center zone, was maintained at 775° C. Analysis of the nanotubes by thermogravimetric analysis (TGA) revealed that the carbon nanotubes contained as much as 17.6 wt. % iron.

What is claimed is:

1. A method for producing carbon nanotubes, wherein said method comprises:
   a. combining metallorganic precursor molecules, at least one of which is of the formula $[Fe_2(C_5H_5)_2(CO)_4]$, with an organic hydrocarbon solvent in a mixture; and
   b. injecting said mixture in the form of droplets into a reactor tube; and
   c. transporting the droplets to a first temperature region of the reactor tube; and
   d. at least partially vaporizing the organic hydrocarbon solvent from the mixture droplets; and
   e. transporting said at least partially vaporized solvent and the metallorganic precursor molecules to a second temperature region of the reactor tube which is at a higher temperature than the first region; and
   f. thermally decomposing the metallorganic precursor molecules into at least metal atoms and carbon atoms; and
   g. depositing one or more clusters of metal atoms on a surface within the second temperature region; and
   h. chemically attaching carbon atoms to the metal atoms of the one or more clusters so as to form one or more carbon nanotubes.

2. The method of claim 1, wherein the organic hydrocarbon solvent is a liquid at room temperature and comprises an aromatic compound.

3. The method of claim 1, wherein the metallorganic precursor molecules and the organic hydrocarbon solvent are liquids at room temperature.

4. The method of claim 3, wherein the metallorganic precursor molecules/organic hydrocarbon liquid mixture is injected as a mist of droplets at room temperature into a first portion of the reactor tube at room temperature.

5. The method of claim 4, wherein the droplets are transported by a carrier gas from the room temperature portion of the reactor tube to at least one of the first and second temperature regions of the reactor tube, wherein said at least one of the first and second temperature regions is above room temperature.

6. The method of claim 5, wherein the temperature of the first temperature region is sufficiently high to vaporize the solvent without vaporizing the metallorganic precursor molecules.

7. The method of claim 6, wherein the second temperature region is at a temperature higher than room temperature.

8. The method of claim 1, wherein the second temperature region of the reactor tube contains surfaces in addition to those of the reactor tube.

9. The method of claim 8, wherein the additional surfaces are made from one or more of the following materials: fused silica (quartz), alumina, stainless steel, tungsten, and tantalum.

10. The method of claim 8, further comprising depositing one or more clusters of metal atoms on the additional surfaces in the second temperature region.

11. The method of claim 10, wherein carbon atoms from the thermally decomposed precursor chemically attach to the clusters of metal particles.

12. The method of claim 11, wherein additional carbon atoms chemically attach to the carbon atoms from the thermally decomposed precursor.

13. The method of claim 1, wherein the temperature of the second temperature region is high enough to thermally decompose the metallorganic precursor molecules.

14. The method of claim 13, wherein the thermal decomposition produces at least individual metal atoms, individual carbon atoms and remaining molecules.

15. The method of claim 13, wherein the second temperature region of the reactor tube includes surfaces in addition to the reactor tube surfaces, the additional surfaces making intimate thermal contact with the interior of the reactor tube.

16. The method of claim 15, wherein the additional surfaces comprise one or more baffles.

17. The method of claim 1, wherein the one or more carbon nanotubes comprises one or more single-walled carbon nanotubes (SWNT).

18. The method of claim 1, wherein the one or more carbon nanotubes comprises one or more multi-walled carbon nanotubes (MWNT).

19. The method of claim 1, wherein the one or more carbon nanotubes comprise one or more multi-walled carbon nanotubes with metal impurities, the method further comprising controlling a wt % of said metal impurities by controlling the concentration of the metallorganic precursor molecules in the mixture.

20. The method of claim 19, further comprising controlling the concentration of metallorganic precursor molecules in the mixture to have a molarity in the vicinity of 0.1, said vicinity containing molarity values either slightly less than or slightly greater than 0.1, so as to produce one or more multi-walled carbon nanotubes having a metal impurity less than 5 wt %.

21. The method of claim 19, further comprising controlling the concentration of metallorganic precursor molecules in the mixture to have a molarity greater than or less than 0.1 so as to produce one or more multi-walled carbon nanotubes having a metal impurity less than 5 wt %.

22. The method of claim 1, further comprising accreting to and chemically attaching additional carbon atoms to the carbon atoms attached to the metal atoms of the one or more clusters.

23. The method of claim 1, wherein, in part (f), the metallorganic precursor molecules are thermally decomposed into at least metal atoms and carbon atoms and remainder molecules, and wherein the method further comprises transporting the remainder molecules away from the surface within the second temperature region.

24. The method of claim 1, wherein the organic hydrocarbon solvent is a liquid at room temperature and comprises toluene.

25. A method for producing carbon nanotubes, wherein said method comprises:
   a. combining metallorganic precursor molecules, at least one of which is of the formula $(C_8H_8)Fe(CO)_3$, with an organic hydrocarbon solvent in a mixture; and
   b. injecting said mixture in the form of droplets into a reactor tube; and
   c. transporting the droplets to a first temperature region of the reactor tube; and
   d. at least partially vaporizing the organic hydrocarbon solvent from the mixture droplets; and
   e. transporting said at least partially vaporized solvent and the metallorganic precursor molecules to a second temperature region of the reactor tube which is at a higher temperature than the first region; and
   f. thermally decomposing the metallorganic precursor molecules into at least metal atoms and carbon atoms; and
   g. depositing one or more clusters of metal atoms on a surface within the second temperature region; and
   h. chemically attaching carbon atoms to the metal atoms of the one or more clusters so as to form one or more carbon nanotubes.

26. The method of claim 25, wherein the organic hydrocarbon solvent is a liquid at room temperature and comprises an aromatic compound.

27. The method of claim 25, wherein the metallorganic precursor molecules and the organic hydrocarbon solvent are liquids at room temperature.

28. The method of claim 27, wherein the metallorganic precursor molecules/organic hydrocarbon liquid mixture is injected as a mist of droplets at room temperature into a first portion of the reactor tube at room temperature.

29. The method of claim 28, wherein the droplets are transported by a carrier gas from the room temperature portion of the reactor tube to at least one of the first and second temperature regions of the reactor tube, wherein said at least one of the first and second temperature regions is above room temperature.

30. The method of claim 29, wherein the temperature of the first temperature region is sufficiently high to vaporize the solvent without vaporizing the metallorganic precursor molecules.

31. The method of claim 30, wherein the second temperature region is at a temperature higher than room temperature.

32. The method of claim 25, wherein the second temperature region of the reactor tube contains surfaces in addition to those of the reactor tube.

33. The method of claim 25, wherein the temperature of the second temperature region is high enough to thermally decompose the metallorganic precursor molecules.

34. The method of claim 33, wherein the thermal decomposition produces at least individual metal atoms, individual carbon atoms and remaining molecules.

35. The method of claim 33, wherein the second temperature region of the reactor tube includes surfaces in addition to the reactor tube surfaces, the additional surfaces making intimate thermal contact with the interior of the reactor tube.

36. The method of claim 35, wherein the additional surfaces comprise one or more baffles.

37. The method of claim 32, wherein the additional surfaces are made from one or more of the following materials: fused silica (quartz), alumina, stainless steel, tungsten, and tantalum.

38. The method of claim 32, further comprising depositing one or more clusters of metal atoms on the additional surfaces in the second temperature region.

39. The method of claim 38, wherein carbon atoms from the thermally decomposed precursor chemically attach to the clusters of metal particles.

40. The method of claim 39, wherein additional carbon atoms chemically attach to the carbon atoms from the thermally decomposed precursor.

41. The method of claim 25, wherein the one or more carbon nanotubes comprises one or more single-walled carbon nanotubes (SWNT).

42. The method of claim 25, wherein the one or more carbon nanotubes comprises one or more multi-walled carbon nanotubes (MWNT).

43. The method of claim 25, wherein the one or more carbon nanotubes comprise one or more multi-walled carbon nanotubes with metal impurities, the method further comprising controlling a wt % of said metal impurities by controlling the concentration of the metallorganic precursor molecules in the mixture.

44. The method of claim 43, further comprising controlling the concentration of metallorganic precursor molecules in the mixture to have a molarity in the vicinity of 0.1, said vicinity containing molarity values either slightly less than or slightly greater than 0.1, so as to produce one or more multi-walled carbon nanotubes having a metal impurity less than 5 wt %.

45. The method of claim 43, further comprising controlling the concentration of metallorganic precursor molecules in the mixture to have a molarity greater than or less than 0.1 so as to produce one or more multi-walled carbon nanotubes having a metal impurity less than 5 wt %.

46. The method of claim 25, further comprising accreting to and chemically attaching additional carbon atoms to the carbon atoms attached to the metal atoms of the one or more clusters.

47. The method of claim 25, wherein, in part (f), the metallorganic precursor molecules are thermally decomposed into at least metal atoms and carbon atoms and remainder molecules, and wherein the method further comprises transporting the remainder molecules away from the surface within the second temperature region.

48. The method of claim 25, wherein the organic hydrocarbon solvent is a liquid at room temperature and comprises toluene.

49. A method for producing carbon nanotubes, wherein said method comprises:
 a. combining metallorganic precursor molecules with an organic hydrocarbon solvent in a mixture; and
 b. injecting said mixture in the form of droplets into a reactor tube; and
 c. transporting the droplets to a first temperature region of the reactor tube; and
 d. at least partially vaporizing the organic hydrocarbon solvent from the mixture droplets; and
 e. transporting said at least partially vaporized solvent and the metallorganic precursor molecules to a second temperature region of the reactor tube which is at a higher temperature than the first region; and
 f. thermally decomposing the metallorganic precursor molecules into at least metal atoms and carbon atoms; and
 g. depositing one or more clusters of metal atoms on a surface within the second temperature region; and
 h. chemically attaching carbon atoms to the metal atoms of the one or more clusters so as to form one or more carbon nanotubes,
 wherein at least one of the metallorganic precursor molecules is of a formula selected from the group consisting of:
  $[Fe_2(C_5H_5)(C_5H_nR_{5-n})(CO)_4]$, where n=0-5 and R=$CH_3$, $C_2H_5$, $C_3H_7$, or $C_4H_9$;
  $[Fe_2(C_5H_nR_{5-n})_2(CO)_4]$, where n=0-5 and R=$CH_3$, $C_2H_5$, $C_3H_7$, or $C_4H_9$;
  $[FeW(CO)_4(C_5H_5)_{2-m}(C_5H_nR_{5-n})_m]$, where m=0-2, n=0-5 and R=$CH_3$, $C_2H_5$, $C_3H_7$, or $C_4H_9$;
  $[FeMn(CO)_7(C_5H_5)_{1-m}(C_5H_nR_{5-n})_m]$, where m=0 or 1, n=0-5 and R=$CH_3$, $C_2H_5$, $C_3H_7$, or $C_4H_9$;
  $[FeRe(CO)_7(C_5H_5)_{1-m}(C_5H_nR_{5-n})_m]$, where m=0 or 1, n=0-5 and R=$CH_3$, $C_2H_5$, $C_3H_7$, or $C_4H_9$;
  $[FeCo(CO)_6(C_5H_5)_{1-m}(C_5H_nR_{5-n})_m]$, where m=0 or 1, n=0-5 and R=$CH_3$, $C_2H_5$, $C_3H_7$, or $C_4H_9$; and
  $[FeNi(CO)_3(C_5H_5)_{1-m}(C_5H_nR_{5-n})_m]$, where m=0-2, n=0-5 and R=$CH_3$, $C_2H_5$, $C_3H_7$, $C_4H_9$, $C_5H_9$.

50. The method of claim 49, wherein the organic hydrocarbon solvent is a liquid at room temperature and comprises an aromatic compound.

51. The method of claim 49, wherein the metallorganic precursor molecules and the organic hydrocarbon solvent are liquids at room temperature.

52. The method of claim 51, wherein the metallorganic precursor molecules/organic hydrocarbon liquid mixture is injected as a mist of droplets at room temperature into a first portion of the reactor tube at room temperature.

53. The method of claim 52, wherein the droplets are transported by a carrier gas from the room temperature portion of the reactor tube to at least one of the first and second temperature regions of the reactor tube, wherein said at least one of the first and second temperature regions is above room temperature.

54. The method of claim 53, wherein the temperature of the first temperature region is sufficiently high to vaporize the solvent without vaporizing the metallorganic precursor molecules.

55. The method of claim 54, wherein the second temperature region is at a temperature higher than room temperature.

56. The method of claim 49, wherein the second temperature region of the reactor tube contains surfaces in addition to those of the reactor tube.

57. The method of claim 56, wherein the additional surfaces are made from one or more of the following materials: fused silica (quartz), alumina, stainless steel, tungsten, and tantalum.

58. The method of claim 56, further comprising depositing one or more clusters of metal atoms on the additional surfaces in the second temperature region.

59. The method of claim 58, wherein carbon atoms from the thermally decomposed precursor chemically attach to the clusters of metal particles.

60. The method of claim 59, wherein additional carbon atoms chemically attach to the carbon atoms from the thermally decomposed precursor.

61. The method of claim 49, wherein the temperature of the second temperature region is high enough to thermally decompose the metallorganic precursor molecules.

62. The method of claim 61, wherein the thermal decomposition produces at least individual metal atoms, individual carbon atoms and remaining molecules.

63. The method of claim 61, wherein the second temperature region of the reactor tube includes surfaces in addition to the reactor tube surfaces, the additional surfaces making intimate thermal contact with the interior of the reactor tube.

64. The method of claim 63, wherein the additional surfaces comprise one or more baffles.

65. The method of claim 49, wherein the one or more carbon nanotubes comprises one or more single-walled carbon nanotubes (SWNT).

66. The method of claim 49, wherein the one or more carbon nanotubes comprises one or more multi-walled carbon nanotubes (MWNT).

67. The method of claim 49, wherein the one or more carbon nanotubes comprise one or more multi-walled carbon nanotubes and metal impurities, the method further comprising controlling a wt % of said metal impurities by controlling the concentration of the metallorganic precursor molecules precursor in the mixture.

68. The method of claim 67, further comprising controlling the concentration of metallorganic precursor molecules in the mixture to have a molarity in the vicinity of 0.1, said vicinity containing molarity values either slightly less than or slightly greater than 0.1, so as to produce one or more multi-walled carbon nanotubes having a metal impurity less than 5 wt %.

69. The method of claim 67, further comprising controlling the concentration of metallorganic precursor molecules in the mixture to have a molarity greater than or less than 0.1 so as to produce one or more multi-walled carbon nanotubes having a metal impurity less than 5 wt %.

70. The method of claim 49, further comprising accreting to and chemically attaching additional carbon atoms to the carbon atoms attached to the metal atoms of the one or more clusters.

71. The method of claim 49, wherein, in part (f), the metallorganic precursor molecules are thermally decomposed into at least metal atoms and carbon atoms and remainder molecules, and wherein the method further comprises transporting the remainder molecules away from the surface within the second temperature region.

72. The method of claim 49, wherein the organic hydrocarbon solvent is a liquid at room temperature and comprises toluene.

\* \* \* \* \*